Feb. 2, 1960     R. J. GOAD     2,923,898
PULSE DELAY APPARATUS
Filed Feb. 24, 1958
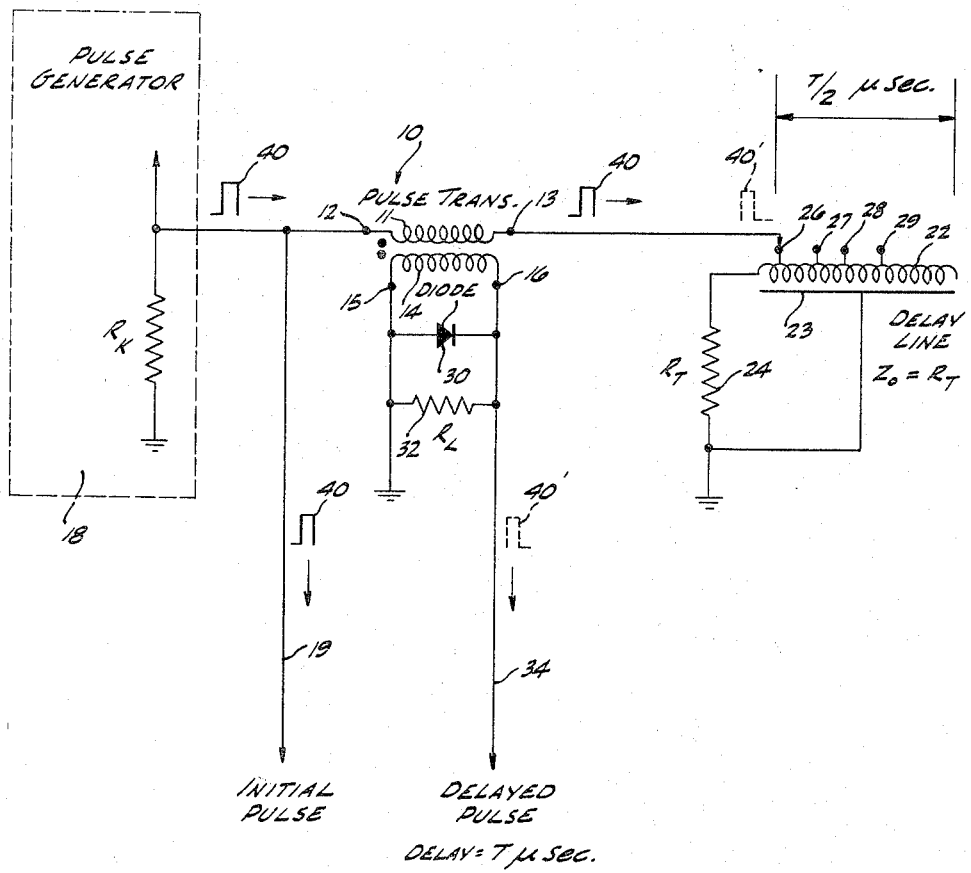
INVENTOR.
ROBERT J. GOAD,
BY
Robert H. Himes
AGENT

United States Patent Office 2,923,898
Patented Feb. 2, 1960

2,923,898
PULSE DELAY APPARATUS

Robert J. Goad, Cambridge, Mass., assignor to Hughes Aircraft Company, Culver City, Calif., a corporation of Delaware Application February 24, 1958, Serial No. 717,260

5 Claims. (Cl. 333—29)

This invention relates to pulse delay devices and more particularly to an apparatus which utilizes the round trip time of a delay line and provides a delayed pulse that may be of the same polarity as the initial pulse.

Present day apparatus utilizing the round trip time of delay lines has many undesirable features, particularly apparatus wherein the initial pulse and the delayed pulse must both be available and of the same polarity as in the present device. An example of such a feature is an apparatus wherein there is the possibility of the reflected pulse retriggering the initiating blocking oscillator. Another such example is apparatus wherein extensive circuitry is employed to provide proper termination at the delay line input terminals resulting in considerable loss of amplitude in the delayed pulses.

It is therefore an object of the present invention to provide an improved pulse delay apparatus.

Another object of the present invention is to provide a pulse delay apparatus adapted to utilize the round trip time of a delay line thereby to permit the use of a physically smaller delay line for a given delay time.

Still another object of the present invention is to provide an adjustable pulse delay apparatus adapted to use the round trip time of a tapped delay line.

According to the present invention, the primary winding of a pulse transformer is connected between a source of pulses to be delayed and an open circuited delay line of a length which is adapted to delay a pulse for only one-half the desired delay time interval. A diode and a load resistor are then each connected across the secondary winding of the pulse transformer, the diode being poled in a manner such that it conducts when a pulse progresses from the source of pulses to the delay line. Thus, in operation a pulse proceeding from the source of pulses to the delay line encounters substantially a short circuit across the primary terminals of the pulse transformer whereby it passes essentially unattenuated into the delay line. When the reflected pulse returns from the delay line, however, substantially all of its voltage appears across the primary winding of the pulse transformer because its secondary winding is now effectively terminated with the load resistor as the diode is now nonconductive. A pulse delayed by the time required for it to progress from the input terminals of the delay line to its open circuited extremity and return is thus generated across the load resistor connected across the secondary winding of the pulse transformer.

The above-mentioned and other features and objects of this invention and the manner of attaining them will become more apparent by reference to the following description taken in conjunction with the accompanying drawing.

Referring now to the drawing, the apparatus of the present invention comprises a pulse transformer 10 which includes a primary winding 11 having output terminals 12, 13 and a secondary winding 14 having output terminals 15, 16. More particularly, the ratio of the number of turns in the secondary winding 14 to those in the primary winding 11 is $n:1$. Also, the turns of the primary and secondary windings 11, 14 are wound in such a manner that the polarity from terminal 12 to terminal 13 of the primary winding 11 is the same as the polarity from terminal 15 to terminal 16 of secondary winding 14.

The primary winding 11 of the pulse transformer 10 is connected between a pulse generator 18 and a delay line 20. The pulse generator 18 has an internal impedance of $R_K$ ohms and may, for example, constitute a conventional type blocking oscillator. More specifically, the output circuit from the pulse generator 18 is connected to the terminal 12 of primary winding 11 of the pulse transformer 10 and also to an output lead 19 thereby to make the initial pulses generated by the pulse generator 10 available for external use.

The delay line 20, on the other hand, receives a signal from a connection to terminal 13 of primary winding 11 of pulse transformer 10. The delay line 20 constitutes an inductive winding 22 which has either a lumped or distributed capacitance to a refernce conductor 23 which is maintained at a substantially fixed potential such as, for example, ground. The inductance of the winding 22 and the capacitance to the conductor 23 is such that the characteristic impedance, $Z_0$, of the delay line 20 is equal to $R_T$ ohms. Accordingly, the input terminals of the delay line 20 are terminated with a resistor 24 which has $R_T$ ohms resistance so as to avoid multiple reflections within the delay line 20. Further, in order to provide an adjustable time delay, the inductive winding 22 is provided with a tap 26 at the input and a series of taps 27, 28 and 29, any one of which may be connected to the terminal 13 of primary winding 11 of pulse transformer 10. Lastly, the unterminated extremity of delay line 20 is left open circuited so that there is no change in the polarity of reflected pulses. It is also to be noted that the delay introduced from the input tap 26 to the unterminated extremity of inductive winding 22 is $T/2$ microseconds whereby the round trip time is $T$ microseconds. This time $T$ is stipulated to be greater than the duration or width of the pulses to be delayed. The manner in which the taps 27, 28, 29 are employed to decrease the delay time will be hereinafter explained in more detail.

In accordance with the present invention, the pulse transformer 10 presents virtually a short circuit to a pulse progressing from the pulse generator 18 to the delay line 20, and a comparatively large impedance to reflected pulses from the delay line 20. A pulse to be delayed may constitute either a positive or a negative voltage excursion. For pulses having positive voltage excursions the presentation of the short circuit by the pulse transformer 10 as defined above is accomplished by connecting a diode 30 or other unidirectionally conducting device between terminals 15 and 16 of secondary winding 14, the diode 30 being poled so as to conduct current from terminal 15 to terminal 16 of the secondary winding 14. That is, the diode 30 is poled to conduct when a pulse progresses from the pulse generator 18 through the primary winding 11 of pulse transformer 10 to the delay line 20. A load resistor 32 of $R_L$ ohms is then connected in parallel with the diode 30, the terminal 15 of secondary winding 14 connected to ground and the terminal 16 of secondary winding 14 connected to an output lead 34. In order not to unduly shunt the terminating resistor 24 of the delay line 20, it is necessary for $$\frac{R_L}{n^2}$$

to be very much greater than $R_T$.

$$\frac{R_L}{n^2}$$

is, of course, the effective resistance of load resistor 32 on the primary side of pulse transformer 10. Alternatively, if it is desired to use only the input tap 26 of delay line 20, values may be chosen for $R_L$ and $R_K$ so that the effective series resistance would substantially equal $R_T$ thus replacing resistor 24. In this event, $$\frac{R_L}{n_2} + R_K = R_T$$

In operation, a positive pulse 40 is first developed across the internal resistance $R_K$ of the pulse generator 18. The positive pulse 40 is, of course, immediately available on the output lead 19. In addition, the positive pulse 40 encounters virtually a short across the primary winding terminals 12, 13 of pulse transformer 10 due to the low resistance of the diode 30 which is connected across secondary winding terminals 15, 16 and poled so as to conduct current during passage of the initial pulse 40 through the primary winding 11. Thus, the positive pulse 40 passes essentially unattenuated into the delay line 20. Since the terminating resistor 24 is of $R_T$ ohms which is equal to the characteristic impedance $Z_0$ of the delay line 20, the pulse 40 sees $$\frac{R_T}{2}$$

ohms at the input terminals of the line 20. In the event that the primary winding terminal 13 of pulse transformer 10 is connected to one of the internal taps 27, 28, 29, the pulse 40 will see the characteristic impedance of delay line 20 in two directions, thus the pulse 40 will continue to see an impedance of substantially $R_{T/2}$ ohms so long as the open circuited extremity of the delay line 20 is not approached too close. The portion of the energy of the pulse 40 launched to the left along delay line 20, as viewed in the drawing, will be terminated by the terminating resistor 24 and will not be reflected in that the resistance $R_T$ of resistor 24 is equal to the characteristic impedance $Z_0$ of the delay line 20. The portion of the energy of the pulse 40 launched to the right, as viewed in the drawing, however, will be reflected from the open circuited extremity of the delay line 20 and return after a delay of T microseconds as reflected pulse 40' (shown in dashed lines) which pulse has a polarity that is the same as the polarity of pulse 40. In the event that primary winding terminal 13 of pulse transformer 10 is connected to tap 26 of delay line, the reflected pulse 40' will be properly terminated by resistor 24 of $R_T$ ohms provided that $$\frac{R_L}{n^2}$$

is very much greater than $R_T$. When the taps 27, 28 or 29 are used, the reflected pulse 40' still sees the characteristic impedance $Z_0 = R_T$ of the delay line 20 provided again that $$\frac{R_L}{n^2}$$

is very much greater than $R_T$. The delay time in the latter cases, however, will be the round trip time between the taps 27, 28 or 29 and the open circuited extremity of the delay line 20.

Since the internal impedance of the pulse generator 18 is $R_K$ ohms which resistance is normally much less than $$\frac{R_L}{n^2}$$

the impedance presented by the pulse transformer 10 when the diode 30 is non-conductive, substantially all of the voltage of the reflected pulse 40' appearing at the tap 26, 27, 28 or 29 of the delay line 20 connected to primary winding terminal 13 is impressed across the primary winding 11 of the pulse transformer 10. This portion of the voltage of reflected pulse 40' is "stepped up" by an amount equal to the turns ratio $n$ of pulse transformer 10 and appears across load resistor 32 of $R_L$ ohms and on the output lead 34. In that the reflected pulse 40' and the initial pulse 40 are of the same polarity but progress through primary winding 11 of pulse transformer 10 in opposite directions, the polarity of the reflected pulse 40' appearing across the secondary winding 14 is opposite from that of the initial pulse 40 whereby the diode 30 does not conduct. In the case shown, the polarity of the reflected pulse 40' developed across the load resistor 32 is positive. This polarity may, of course, be changed by connecting the secondary winding terminal 16 of pulse transformer 10 to ground rather than the secondary winding terminal 15 as previously shown and described.

What is claimed is:

1. A pulse delay apparatus comprising a delay line having first and second extremities and an inherent characteristic impedance, said first extremity being terminated with an impedance of a resistance substantially equal to said characteristic impedance and said second extremity being open circuited; a pulse transformer having a primary winding and a secondary winding, said primary winding having two extremities, one extremity being responsive to pulses to be delayed and the remaining extremity being connected to said delay line; and a unidirectionally conducting device connected across the terminals of said secondary winding of said pulse transformer, said device being poled so as to conduct when a pulse progresses through said primary winding to said delay line.

2. A pulse delay apparatus comprising a source of pulses to be delayed; a delay line having first and second extremities and an inherent characteristic impedance; means for terminating said first extremity of said delay line with an impedance substantially equal to said characteristic impedance, thereby to minimize reflections therefrom; means for terminating said second extremity of said delay line with an impedance that is substantially greater than said characteristic impedance thereby to reflect a pulse of the same polarity as incident thereon; a pulse transformer having a primary winding and a secondary winding, said primary winding being connected between said source of pulses and said delay line; a unidirectionally conducting device connected across the terminals of said secondary winding of said pulse transformer, said device being poled so as to conduct when a pulse progresses from said source of pulses through said primary winding to said delay line; and a load impedance connected across the terminals of said secondary winding in parallel with said unidirectionally conducting device.

3. The pulse delay apparatus as defined in claim 2 wherein the ratio of the number of turns of said secondary winding to the turns of said primary winding of said pulse transformer is $n:1$ and wherein said load impedance constitutes a resistor, the resistance of said resistor divided by $n^2$ being substantially greater than said characteristic impedance.

4. The pulse delay apparatus as defined in claim 2 which additionally includes means for maintaining the terminal of said secondary winding of said pulse transformer from which said unidirectionally conductive device conducts current at substantially ground potential whereby a delayed pulse of positive polarity is generated across said load impedance.

5. A pulse delay apparatus comprising a source of pulses to be delayed; a delay line having first and second extremities, a plurality of intermediate taps therealong and an inherent characteristic impedance; means for terminating said first extremity of said delay line with an impedance substantially equal to said characteristic impedance, thereby to minimize reflections therefrom; means for terminating said second extremity of said delay line with an impedance that is substantially greater than said characteristic impedance thereby to reflect a pulse of the same polarity as incident thereon; a pulse transformer having a primary winding and a secondary winding, said primary winding being connected between said sources of pulses and said delay line, said primary winding being connected to said delay line at either said first extremity thereof or at one of said plurality of intermediate taps therealong; a unidirectionally conducting device connected across the terminals of said secondary winding of said pulse transformer, said device being poled so as to conduct when a pulse progresses from said source of pulses through said primary winding to said delay line; and a load resistor connected across the terminals of said secondary winding.

References Cited in the file of this patent

UNITED STATES PATENTS 2,509,269    Hana _____ May 30, 1950